United States Patent
Earl

(10) Patent No.: US 7,335,098 B2
(45) Date of Patent: Feb. 26, 2008

(54) DVD PLAYER BASED TIC-TAC-TOE TV VIDEO GAME

(75) Inventor: Richard P. Earl, Bolingbrook, IL (US)

(73) Assignee: BrickLoop, Inc.

( * ) Notice: Subject to any disclaimer, the term of this patent is extended or adjusted under 35 U.S.C. 154(b) by 246 days.

(21) Appl. No.: 11/163,403

(22) Filed: Oct. 18, 2005

(65) Prior Publication Data

US 2006/0084484 A1    Apr. 20, 2006

Related U.S. Application Data

(60) Provisional application No. 60/619,793, filed on Oct. 18, 2004.

(51) Int. Cl.
*A63F 13/00*    (2006.01)

(52) U.S. Cl. .................. 463/9; 463/30; 463/32

(58) Field of Classification Search ............... 273/434, 273/271; 463/20, 9
See application file for complete search history.

(56) References Cited

U.S. PATENT DOCUMENTS 5,411,271 A * 5/1995 Mirando ..................... 463/9
6,645,070 B2 * 11/2003 Lupo ........................... 463/9
2004/0048642 A1  3/2004 Kinzer et al.
2005/0054423 A1 * 3/2005 Wadleigh ..................... 463/20

* cited by examiner

*Primary Examiner*—John M Hotaling, II
*Assistant Examiner*—Jeffrey K. Wong

(57) ABSTRACT

A DVD Player based Tic-Tac-Toe game played utilizing the capabilities of a DVD player via either a stand alone DVD Player or a software-based DVD Player on a computer. The game is limited to a person challenging a DVD Player using fixed automatic opposing player logic. By matching up symmetrical patterns of the resulting tokens, after each opposing token position is selected, the number of unique DVD menus needed for a base version of the game (which never allows the person playing the game to win) can be reduced to just 30 DVD Menus. This matching is arrived at by animating in 3-D space the transitions of the Tic-Tac-Toe game board via flipping and/or rotating between game board states. It then allows alternate paths of game play to be added to the fixed logic that can allow a person to win. It also allows custom content to be arrived at during game play.

11 Claims, 27 Drawing Sheets

Left-Right Flip

Transition - Level-4B-Position-5-UNIQUE

Game Board Construction

Re-orientation Patterns

Level 1 to Level 2 Transitions

Example of a WIN path added

Figure 1:
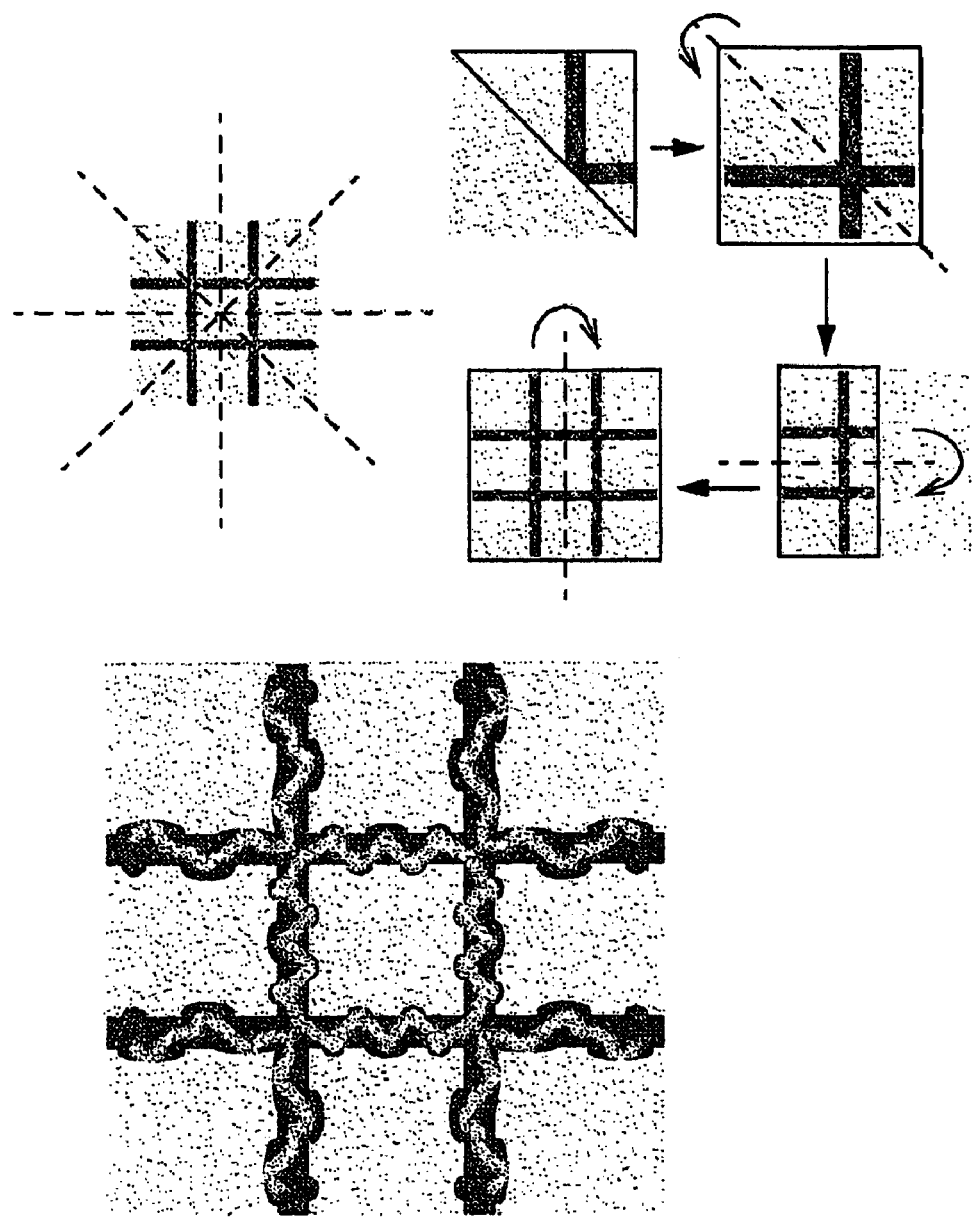

Example of Having a Secondary WIN Path

Menus Needed for Normal DVD Menu Logic

| # | Menu Layout | Table Name | # | Menu Layout | Table Name | # | Menu Layout | Table Name |
|---|---|---|---|---|---|---|---|---|
| 1 | | Level-1 | 11 | | Level-4G | 21 | | Level-6H |
| 2 | | Level-2A | 12 | | Level-4H | 22 | | Level-6I |
| 3 | | Level-2B | 13 | | Level-4I | 23 | | Level-6J |
| 4 | | Level-2C | 14 | | Level-6A | 24 | | Level-6K |
| 5 | | Level-4A | 15 | | Level-6B | 25 | | Level-8A |
| 6 | | Level-4B | 16 | | Level-6C | 26 | | Level-8B |
| 7 | | Level-4C | 17 | | Level-6D | 27 | | Level-8C |
| 8 | | Level-4D | 18 | | Level-6E | 28 | | Level-8D |
| 9 | | Level-4E | 19 | | Level-6F | 29 | | Level-8E |
| 10 | | Level-4F | 20 | | Level-6G | 30 | | Level-8F |

Fig. 9

Level-1

| Menu Layout | Transition Name | Top-Bottom Flip | Left-Right Flip | Rotate 180 | Rotate 90 | Rotate -90 | Links To |
|---|---|---|---|---|---|---|---|
| | Level-1-Position-1 | | | | - | | Level-2A |
| | Level-1-Position-2-UNIQUE | | | | | X | Level-1-Position-4 |
| | Level-1-Position-3-UNIQUE | | X | | | | Level-1-Position-1 |
| | Level-1-Position-4 | | | | - | | Level-2B |
| | Level-1-Position-5 | | | | - | | Level-2C |
| | Level-1-Position-6-UNIQUE | | | X | | | Level-1-Position-4 |
| | Level-1-Position-7-UNIQUE | X | | | | | Level-1-Position-1 |
| | Level-1-Position-8-UNIQUE | | | | X | | Level-1-Position-4 |
| | Level-1-Position-9-UNIQUE | | | | | X | Level-1-Position-1 |

Fig. 10

Level-2A

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| | Level-2A-Position-1 | | | | | | Level-4A |
| | Level-2A-Position-2 | | | | | | Level-4B |
| | Level-2A-Position-3-UNIQUE | X | | | X | | Level-2A-Position-1 |
| | Level-2A-Position-4-UNIQUE | X | | | X | | Level-2A-Position-6 |
| | Level-2A-Position-5-UNIQUE | | | | X | | Level-2A-Position-2 |
| | Level-2A-Position-6 | | | | | | Level-4C |
| | Level-2A-Position-7 | | | | | | Level-4D |

Fig. 11a

Level-2B

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| | Level-2B-Position-1 | | | | | | UNUSED (Same as Level-2A-Position-3-UNIQUE) |
| | Level-2B-Position-2 | | | | | | Level-4E |
| | Level-2B-Position-3-UNIQUE | X | | | | | Level-2A-Position-4-UNIQUE |
| | Level-2B-Position-4 | | | | | | Level-4F |
| | Level-2B-Position-5-UNIQUE | X | | | | | Level-2A-Position-3-UNIQUE |
| | Level-2B-Position-6-UNIQUE | | | | X | | Level-2B-Position-2 |
| | Level-2B-Position-7-UNIQUE | | | X | | | Level-2A-Position-4-UNIQUE |

Fig. 11b

Level-2C

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| | Level-2C-Position-1 | | | | | - | Level-4G |
| | Level-2C-Position-2 | | | | | - | SlLevel-2C-Position-2 |
| | Level-2C-Position-3-UNIQUE | X | | | X | | Level-2C-Position-1 |
| | Level-2C-Position-4 | | | | | - | Level-4H |
| | Level-2C-Position-5-UNIQUE | | X | | | X | Level-2C-Position-2 |
| | Level-2C-Position-6-UNIQUE | R | | | R | | Level-2C-Position-4 |
| | Level-2C-Position-7 | | | | | - | Level-4I |

Fig. 11c

Fig. 12a

Level-4A

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| x\|x\|o / \|x\|o / | Level-4A-Position-1-WIN-6A | - | | | | | x\|x\|o / x\|o\| / o\| \| Game Over |
| x\|x\|o / \|o\|x / | Level-4A-Position-2-WIN-6B | - | | | | | x\|x\|o / \|o\|x / o\| \| Game Over |
| x\|x\|o / \|o\| / x\| \| | Level-4A-Position-3-BLK-to-6A | - | | | | | Level-6A |
| x\|x\|o / \|o\| / \|x\| | Level-4A-Position-4-WIN-6C | - | | | | | x\|x\|o / \|o\| / o\|x\| Game Over |
| x\|x\|o / \|o\| / \| \|x | Level-4A-Position-5-WIN-6D | - | | | | | x\|x\|o / \|o\| / o\| \|x Game Over |

Level-4B

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| x\|o\|x / x\|o\| / | Level-4B-Position-1-WIN-6E | - | | | | | x\|o\|x / x\|o\| / \|o\| Game Over |
| x\|o\|x / \|o\|x / | Level-4B-Position-2-UNIQUE | X | | | | | Level-4B-Position-1-WIN-6E |
| x\|o\|x / \|o\| / x\| \| | Level-4B-Position-3-WIN-6F | - | | | | | x\|o\|x / \|o\| / x\|o\| Game Over |
| x\|o\|x / \|o\| / \|x\| | Level-4B-Position-4-BLK-to-6B | - | | | | | Level-6B |
| x\|o\|x / \|o\| / \| \|x | Level-4B-Position-5-UNIQUE | X | | | | | Level-4B-Position-3-WIN-6F |

Fig. 12b

Fig. 12c

Level-4C

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| [grid] | Level-4C-Position-1-WIN-6G | | | | | | [grid] Game Over |
| [grid] | Level-4C-Position-2-BLK-to-6C | | | | | | Level-6C |
| [grid] | Level-4C-Position-3-UNIQUE | X | | | X | | Level-4A-Position-2-WIN-6B |
| [grid] | Level-4C-Position-4-WIN-6H | | | | | | [grid] Game Over |
| [grid] | Level-4C-Position-5-WIN-6I | | | | | | [grid] Game Over |

Level-4D

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| [grid] | Level-4D-Position-1-UNIQUE | X | | | | | Level-4B-Position-3-WIN-6F |
| [grid] | Level-4D-Position-2-WIN-6J | | | | | | [grid] Game Over |
| [grid] | Level-4D-Position-3-WIN-6K | | | | | | [grid] Game Over |
| [grid] | Level-4D-Position-4-WIN-6L | | | | | | [grid] Game Over |
| [grid] | Level-4D-Position-5-BLK-to-6D | | | | | | Level-6D |

Fig. 12d

Fig. 12e

Level-4E

| Menu Layout | Transition Name | Top-Bottom Flip | Left-Right Flip | Rotate 180 | Rotate 90 | Rotate -90 | Links To |
|---|---|---|---|---|---|---|---|
| | Level-4E-Position-1-UNIQUE | X | | | | | Level-4A-Position-2-WIN-6B |
| | Level-4E-Position-2-WIN-6M | | | - | | | Game Over |
| | Level-4E-Position-3-UNIQUE | | | X | | | Level-4A-Position-2-WIN-6B |
| | Level-4E-Position-4-UNIQUE | X | | X | | | Level-4E-Position-2-WIN-6M |
| | Level-4E-Position-5-BLK-to-6E | | | - | | | Level-6E |

Level-4F

| Menu Layout | Transition Name | Top-Bottom Flip | Left-Right Flip | Rotate 180 | Rotate 90 | Rotate -90 | Links To |
|---|---|---|---|---|---|---|---|
| | Level-4F-Position-1-WIN-6N | | | - | | | Game Over |
| | Level-4F-Position-2-UNIQUE | X | | | | | Level-4F-Position-1-WIN-6N |
| | Level-4F-Position-3-WIN-6O | | | - | | | Game Over |
| | Level-4F-Position-4-BLK-to-6F | | | - | | | Level-6F |
| | Level-4F-Position-5-UNIQUE | X | | | | | Level-4F-Position-3-WIN-6O |

Fig. 12f

Fig. 12g

Level-4G

| Menu Layout | Transition Name | Top-Bottom Flip | Left-Right Flip | Rotate 180 | Rotate 90 | Rotate -90 | Links To |
|---|---|---|---|---|---|---|---|
| | Level-4G-Position-1-BLK-to-6G | | | | | - | Level-6G |
| | Level-4G-Position-2-BLK-to-6H | | | | | - | Level-6H |
| | Level-4G-Position-3-BLK-to-6I | | | | | - | Level-6I |
| | Level-4G-Position-4-BLK-to-6J | | | | | - | Level-6J |
| | Level-4G-Position-5-BLK-to-6K | | | | | - | Level-6K |

Level-4H

| Menu Layout | Transition Name | Top-Bottom Flip | Left-Right Flip | Rotate 180 | Rotate 90 | Rotate -90 | Links To |
|---|---|---|---|---|---|---|---|
| | Level-4H-Position-1-WIN-6P | | | | | - | Game Over |
| | Level-4H-Position-2-WIN-6Q | | | | | - | Game Over |
| | Level-4H-Position-3-BLK-SPCL | | | | | - | S2Level-4H-Position-3-BLK-SPCL |
| | Level-4H-Position-4-WIN-6R | | | | | - | Game Over |
| | Level-4H-Position-5-WIN-6S | | | | | - | Game Over |

Fig. 12h

Fig. 12i

Level-4I

| Menu Layout | Transition Name | Transitions (Top-Bottom Flip / Left-Right Flip / Rotate 180 / Rotate 90 / Rotate -90) | Links To |
|---|---|---|---|
| (O_O / _X_ / __X) | Level-4I-Position-1-BLK-SPCL | - | S3Level-4I-Position-1-BLK-SPCL |
| (O_O / XX_ / __X) | Level-4I-Position-2-WIN-6T | - | (OOO / XX_ / __X) Game Over |
| (O_O / _XX / __X) | Level-4I-Position-3-WIN-6U | - | (OOO / _XX / __X) Game Over |
| (O_O / _X_ / X_X) | Level-4I-Position-4-WIN-6V | - | (OOO / _X_ / X_X) Game Over |
| (O_O / _X_ / XX__) | Level-4I-Position-5-WIN-6W | - | (OOO / _X_ / XX_) Game Over |

Level-6A

| Menu Layout | Transition Name | Transitions (Top-Bottom Flip / Left-Right Flip / Rotate 180 / Rotate 90 / Rotate -90) | Links To |
|---|---|---|---|
| (XXO / OOX / X__) | Level-6A-Position-1-BLK-to-8A | - | Level-8A |
| (XXO / OO_ / XX_) | Level-6A-Position-2-WIN-8A | - | (XXO / OOO / XX_) Game Over |
| (XXO / OO_ / X_X) | Level-6A-Position-3-WIN-8B | - | (XXO / OOO / X_X) Game Over |

Fig. 13a

Fig. 13b

Level-6B

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| XOX / OOX / X | Level-6B-Position-1-BLK-to-8B | | | | | - | Level-8B |
| XOX / OO / XX | Level-6B-Position-2-WIN-8C | | | | | - | XOX / OOO / XX Game Over |
| XOX / OO / XX | Level-6B-Position-3-WIN-8D | | | | | - | XOX / OOO / XX Game Over |

Level-6C

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| XOX / XO / OX | Level-6C-Position-1-UNIQUE | X | | X | | | Level-6A-Position-1-BLK-to-8A |
| XOX / OX / OX | Level-6C-Position-2-BLK-SPCL | | | | | - | S4Level-6C-Position-2-BLK-SPCL |
| XOX / O / OXX | Level-6C-Position-3-BLK-to-8C | | | | | - | Level-8C |

Fig. 13c

Fig. 13d

Level-6D

| Menu Layout | Transition Name | Top-Bottom Flip | Left-Right Flip | Rotate 180 | Rotate 90 | Rotate -90 | Links To |
|---|---|---|---|---|---|---|---|
| [board] | Level-6D-Position-1 | | | | | | UNUSED (Same as Level-6C-Position-3-BLK-to-8C) |
| [board] | Level-6D-Position-2-WIN-8E | | | | | | [board] Game Over |
| [board] | Level-6D-Position-3-WIN-8F | | | | | | [board] Game Over |

Level-6E

| Menu Layout | Transition Name | Top-Bottom Flip | Left-Right Flip | Rotate 180 | Rotate 90 | Rotate -90 | Links To |
|---|---|---|---|---|---|---|---|
| [board] | Level-6E-Position-1-WIN-8G | | | | | | [board] Game Over |
| [board] | Level-6E-Position-2-BLK-SPCL | | | | | | S5Level-6E-Position-2-BLK-SPCL |
| [board] | Level-6E-Position-3-WIN-8H | | | | | | [board] Game Over |

Fig. 13e

Fig. 13f

Level-6F

| Mini Layout | Transition Name | Transitions | | | | | Links To | |
|---|---|---|---|---|---|---|---|---|
| | | Top-Bottom Flip | Left-Right Flip | Rotate 180 | Rotate 90 | Rotate -90 | | |
| O O _ / X O X / _ X _ | Level-6F-Position-1-WIN-8I | | | | | - | O O X / X O X / _ X O | Game Over |
| O O _ / X O X / X X _ | Level-6F-Position-2-WIN-8J | | | | | - | O O O / X O X / X X _ | Game Over |
| O O _ / X O X / _ X X | Level-6F-Position-3-WIN-8K | | | | | - | O O O / X O X / _ X X | Game Over |

Level-6G

| Mini Layout | Transition Name | Transitions | | | | | Links To | |
|---|---|---|---|---|---|---|---|---|
| | | Top-Bottom Flip | Left-Right Flip | Rotate 180 | Rotate 90 | Rotate -90 | | |
| O X X / _ X _ / O O _ | Level-6G-Position-1-WIN-8L | | | | | - | O X X / X X _ / O O O | Game Over |
| O X X / _ X X / O O _ | Level-6G-Position-2-WIN-8M | | | | | - | O X X / O X X / O O _ | Game Over |
| O X X / _ X _ / O O X | Level-6G-Position-3-WIN-8N | | | | | - | O X X / O X _ / O O X | Game Over |

Fig. 13g

Fig. 13h

Level-6H

| Menu Layout | Transition Name | Top-Bottom Flip | Left-Right Flip | Rotate 180 | Rotate 90 | Rotate -90 | Links To |
|---|---|---|---|---|---|---|---|
| | Level-6H-Position-1-BLK-to-8D | | | | | | Level-8D |
| | Level-6H-Position-2-UNIQUE | X | | | X | | Level-6H-Position-1-BLK-to-8D |
| | Level-6H-Position-3-BLK-to-8E | | | | | | Level-8E |

Level-6I

| Menu Layout | Transition Name | Top-Bottom Flip | Left-Right Flip | Rotate 180 | Rotate 90 | Rotate -90 | Links To |
|---|---|---|---|---|---|---|---|
| | Level-6I-Position-1-WIN-8O | | | | | | Game Over |
| | Level-6I-Position-2-BLK-SPCL | | | | | | S6Level-6I-Position-2-BLK-SPCL |
| | Level-6I-Position-3-WIN-8P | | | | | | Game Over |

Fig. 13i

Fig. 13j

Level-6J

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| [O X O / X X / X O] | Level-6J-Position-1-BLK-SPCL | | | | | - | S7Level-6J-Position-1-BLK-SPCL |
| [O X O / X X / X O] | Level-6J-Position-2-BLK-SPCL | | | | | - | S8Level-6J-Position-2-BLK-SPCL |
| [O X O / X / X O X] | Level-6J-Position-3-BLK-to-8P | | | | | - | Level-8P |

Level-6K

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| [O X / X / O O X] | Level-6K-Position-1-WIN-8Q | | | | | - | [O X X / O X / O O X] Game Over |
| [O X / X X / O O X] | Level-6K-Position-2-BLK-SPCL | | | | | - | S9Level-6K-Position-2-BLK-SPCL |
| [O X / X X / O O X] | Level-6K-Position-3-WIN-8R | | | | | - | [O X / O X X / O O X] Game Over |

Fig. 13k

Fig. 14a

Level-8A

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| X X O / O O X / X O | Level-8A-Position-1-CATS | | | | | | Game Over |

Fig. 14b

Level-8B

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| X O X / O O X / X O | Level-8B-Position-1-CATS | | | | | | Game Over |

Level-8C

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| X O X / X O O / O X X | Level-8C-Position-1-CATS | | | | | X | Level-8B-Position-1-CATS |

Fig. 14c

Fig. 14d

Level-8D

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| O X X / X X O / O O X | Level-8D-Position-1-CATS | - | | | | | Game Over |

Fig. 14e

Level-8E

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| O X O / X X O / O X | Level-8E-Position-1-CATS | - | X | | | X | Level-8D-Position-1-CATS |

Level-8F

| Menu Layout | Transition Name | Transitions | | | | | Links To |
|---|---|---|---|---|---|---|---|
| | | Top-Bottom Flip | Left-Right Flip | Rotate 180 | Rotate 90 | Rotate -90 | |
| O X O / O X X / X O X | Level-8F-Position-1-CATS | - | | | | X | Level-8D-Position-1-CATS |

Fig. 14f

Special Transitions After "O" Token Placement

| Transition Name | At Start of Special Transition | Top-Bottom Flip | Left-Right Flip | Rotate 180 | Rotate 90 | Rotate -90 | Link To |
|---|---|---|---|---|---|---|---|
| S1Level-2C-Position-2 | (from Level-2C-Position-2) | | | | x | | Level-4I |
| S2Level-4H-Position-3-BLK-SPCL | (from Level-4H-Position-3-BLK-SPCL) | | | | x | | Level-6K |
| S3Level-4I-Position-1-BLK-SPCL | (from Level-4I-Position-1-BLK-SPCL) | | x | | | | Level-6J |
| S4Level-6C-Position-2-BLK-SPCL | (from Level-6C-Position-2-BLK-SPCL) | | | | x | | Level-8A |
| S5Level-6E-Position-2-BLK-SPCL | (from Level-6E-Position-2-BLK-SPCL) | | | | x | | Level-8A |
| S6Level-6I-Position-2-BLK-SPCL | (from Level-6I-Position-2-BLK-SPCL) | | x | | | | Level-8E |

Fig. 15a

Special Transitions After "O" Token Placement

| Transition Name | At Start of Special Transition | Top-Bottom Flip | Left-Right Flip | Rotate 180 | Rotate 90 | Rotate -90 | Link To |
|---|---|---|---|---|---|---|---|
| S7Level-6J-Position-1-BLK-SPCL | (from Level-6J-Position-1-BLK-SPCL) | X | | | X | | Level-8D |
| S8Level-6J-Position-2-BLK-SPCL | (from Level-6J-Position-2-BLK-SPCL) | | X | | | | Level-8B |
| S9Level-6K-Position-2-BLK-SPCL | (from Level-6K-Position-2-BLK-SPCL) | X | | | X | | Level-8F |

Fig. 15b

DVD PLAYER BASED TIC-TAC-TOE TV VIDEO GAME

The gaming industry revolves around the game consoles that large corporations have developed. These game consoles allow for sophisticated real-time 3-D rendering during game play. The games are very attractive, however they are expensive. For an individual to get involved with video gaming, many hundreds of dollars may be spent even for the simplest of games.

Over the past few years DVD authoring technology has been made available to individual developers at a relatively low price.

DVD players have become commodity items. Many are priced below $50.00 making them very accessible to most households.

DVD players have limited capabilities for inter activity and do not have any 3-D rendering capabilities. However, menus can be linked together with smooth transitions which use pre-rendered video material. This gives the one who is operating the DVD player a high tech game feel as they navigate through the menus.

Tic-Tac-Toe is available for just about any computer or game console, however it can not be found for DVD players.

A straight forward way of making a DVD Player Based Tic-Tac-Toe game would be to include a menu for each state of the game. At the beginning of game play there are 9 positions available to choose from in the 3×3 grid (referred to as the game board). There are also 2 types of tokens (specified herein as X's and O's in which X's are the first tokens used at the beginning of game play). These tokens are placed in one of the nine unoccupied grid positions during game play. One token at a time is added to the game board in unoccupied grid positions alternating token types on successive turns until one token type occupies 3 grid positions which line up in a straight line path through either a row, a column, or diagonally or until all grid positions have been occupied.

In this straight forward implementation the game would be started by presenting a DVD menu which contained an empty Tic-Tac-Toe board. After the first token is placed, one of 9 new menus would be presented each representing a position occupied by the first X token which was used at the start of game play. Each of these 9 menus would have 8 unoccupied grid positions available for opposing token placement. This would follow through until either one token type had 3 tokens in a row, a column, or along the diagonals, or when all grid positions have been occupied. The number of menu screens needed up until there are at least 3 tokens of the same type in the grid would be 9×8×7×6×5=15120 menus. This is only if the game play was ended after the placement of the first 5 tokens. However if no 3 in a row pattern results, game play could continue until all 9 grid positions have been filled. This would multiply out into many more thousands of menus which would have to be supplied.

One way to reduce the number of menus needed is by automatically placing one of the opposing tokens via Normal DVD Menu Logic. This would provide a "Human vs. DVD Menu logic" game. The Normal DVD Menu Logic would always choose the best strategic position thus reducing the number of menus needed. In this type of game the human player would always go first, otherwise the game would be pretty boring since the best strategic opening position for the Normal DVD Menu Logic would always be the center grid position. The Normal DVD Menu Logic is designed to never allow the human player to win. The Normal DVD Menu Logic needs at least 6 tokens to be placed before it has 3 of its tokens placed on the game board at which point it could win. This would result in 9×1×7×1×5×1=315 menus needed if the human player let the Normal DVD Menu Logic win. There would still have to be many more menus for the placement of the remaining tokens if the goal of 3 tokens of the same type in a row has not been achieved until more tokens are on the game board or if it is never achieved during game play. This still leaves an enormous task for constructing all these menus and then linking them all together and end up with a functional DVD based Tic-Tac-Toe Game.

BREIF DESCRIPTION OF DRAWING

Figure 2:
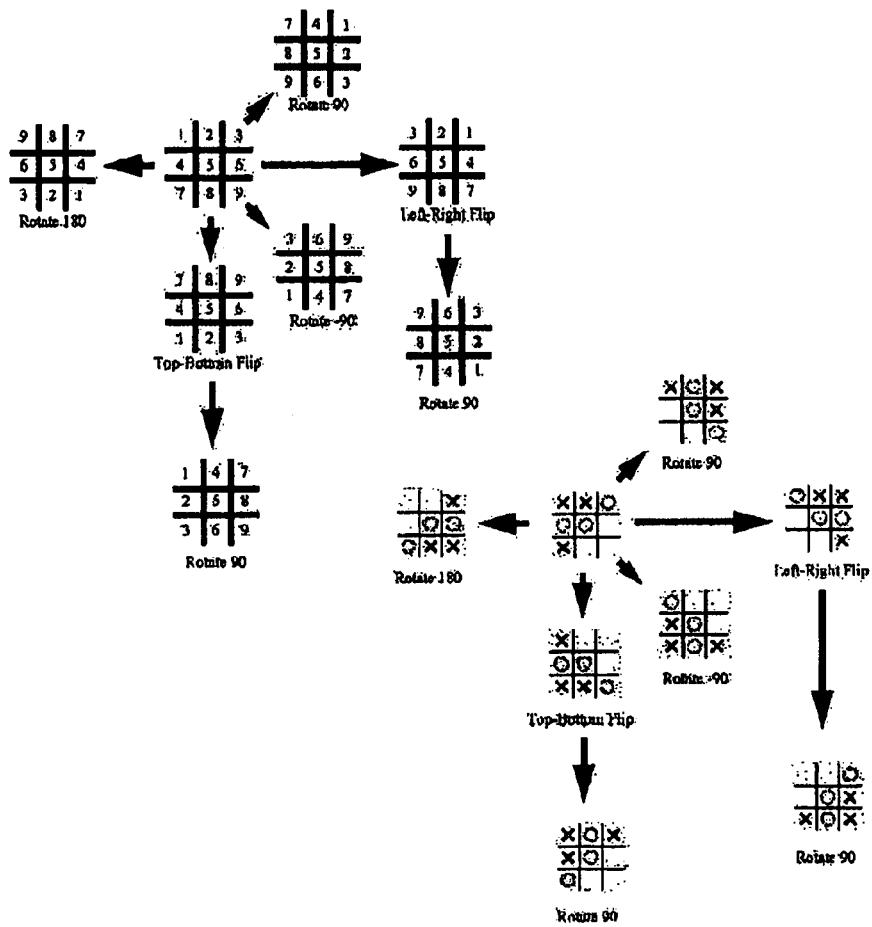
Figure 3:
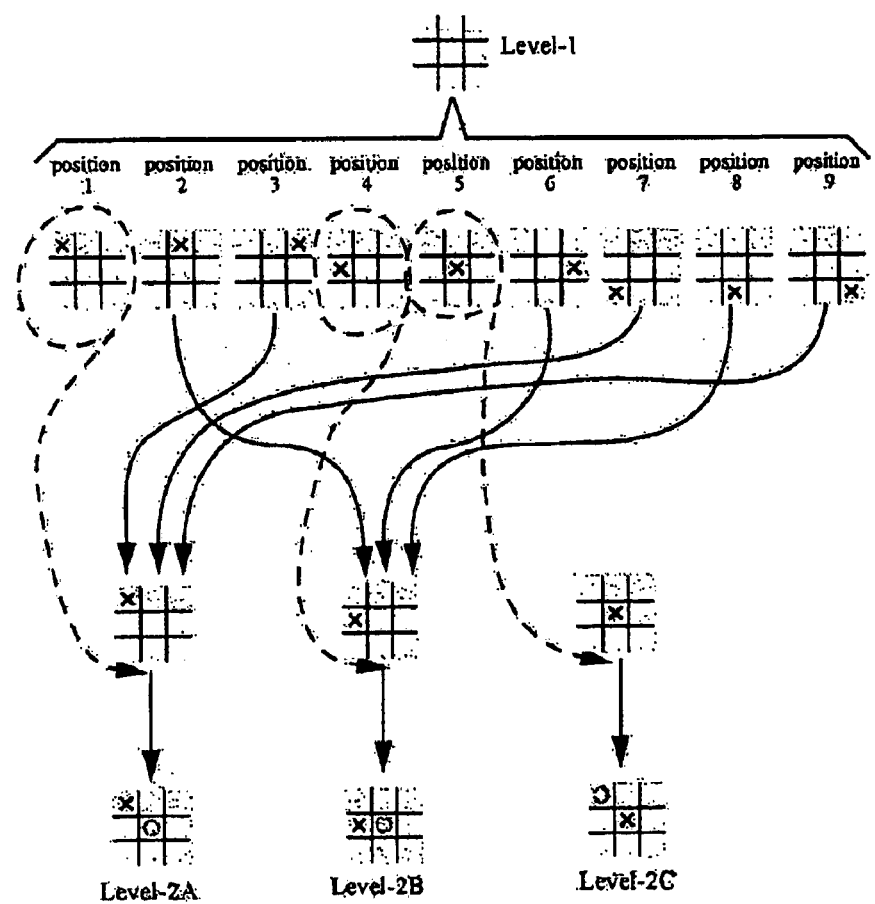
Figure 4:
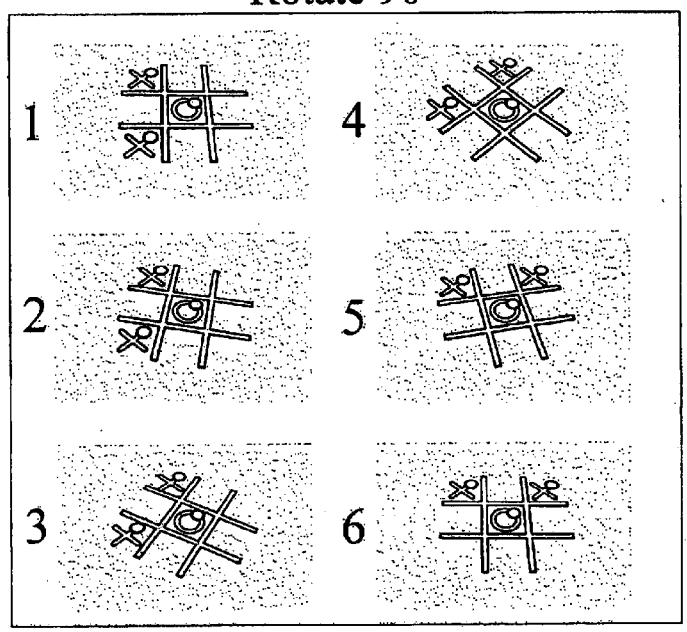
Figure 5:
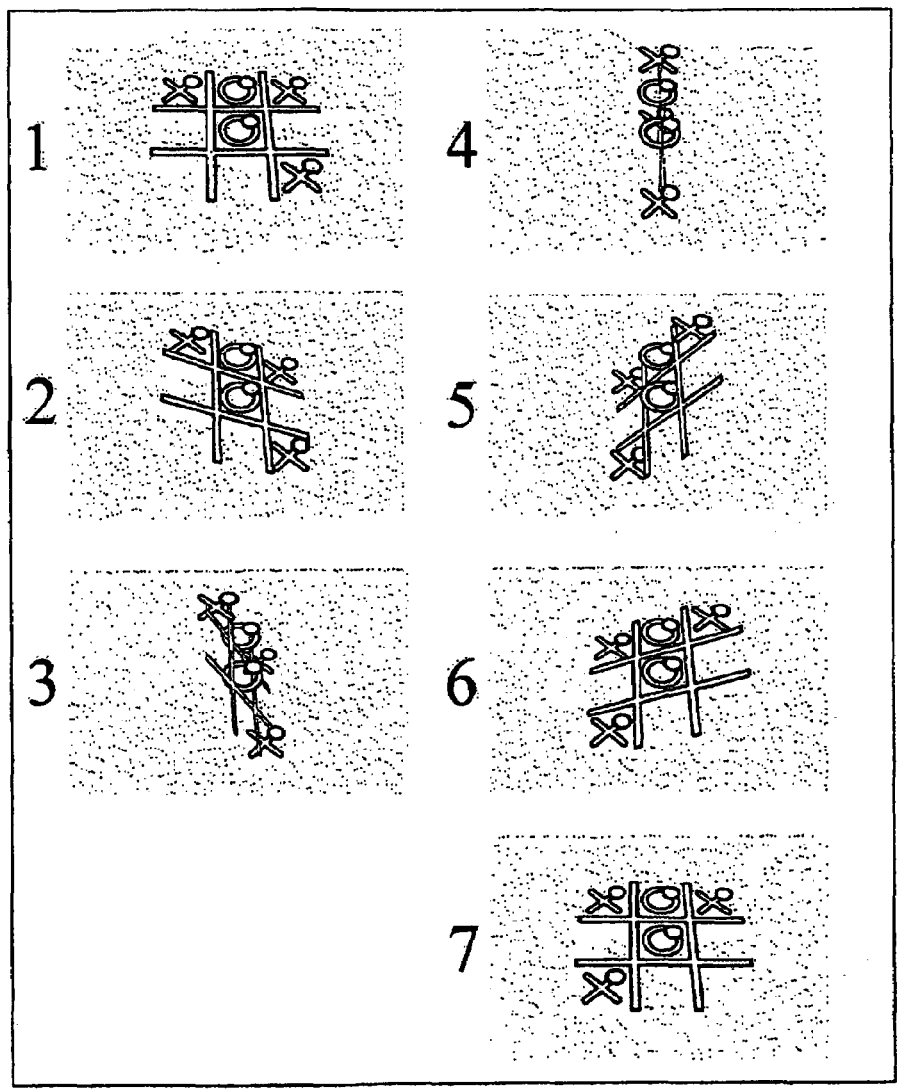
Figure 6:
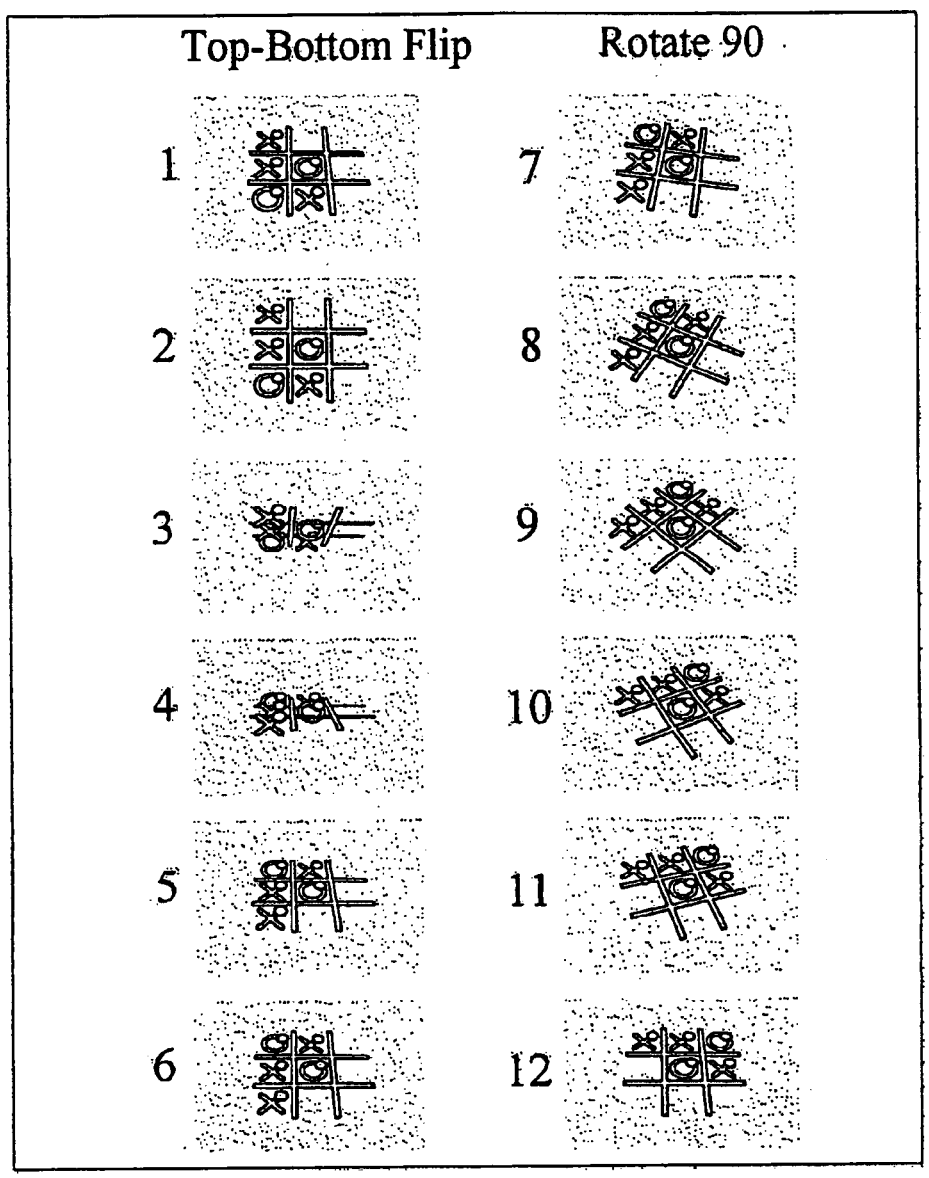
Figure 7:
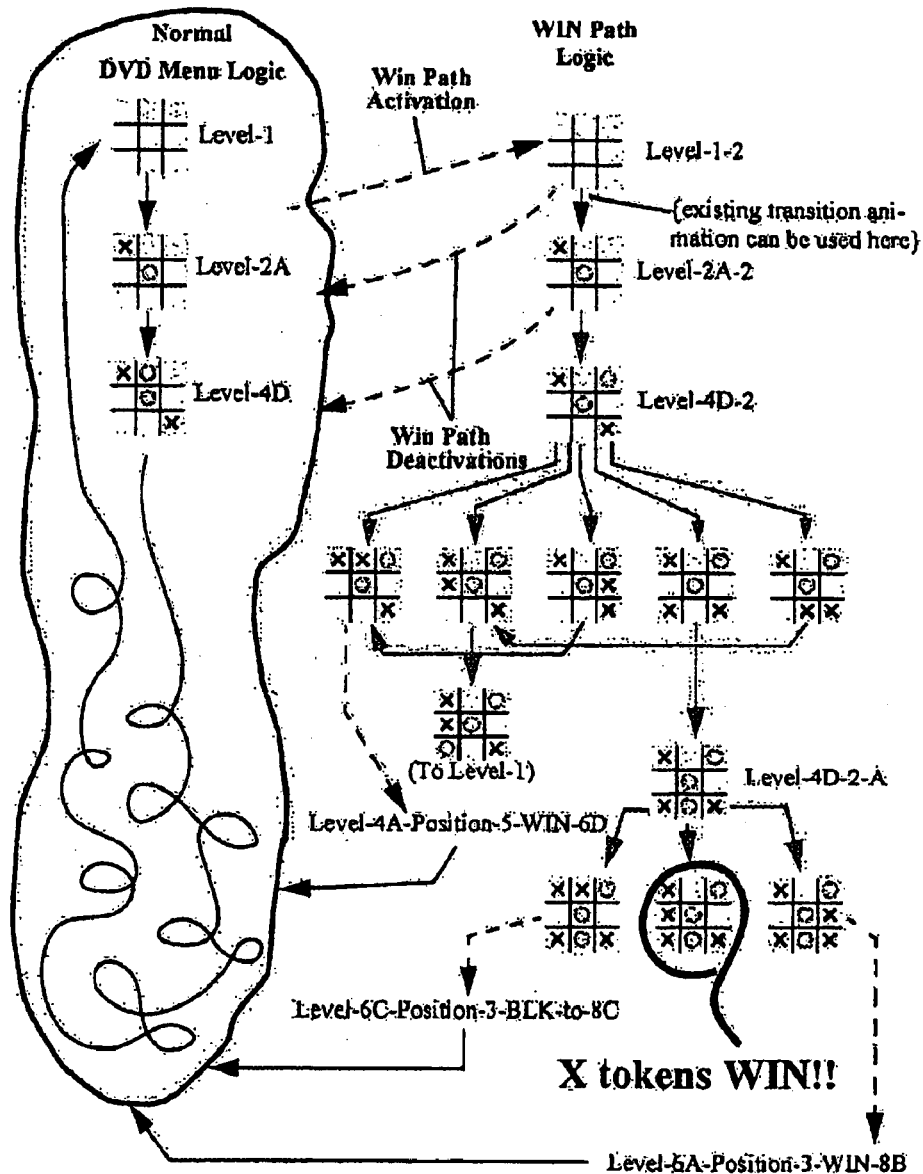
Figure 8:
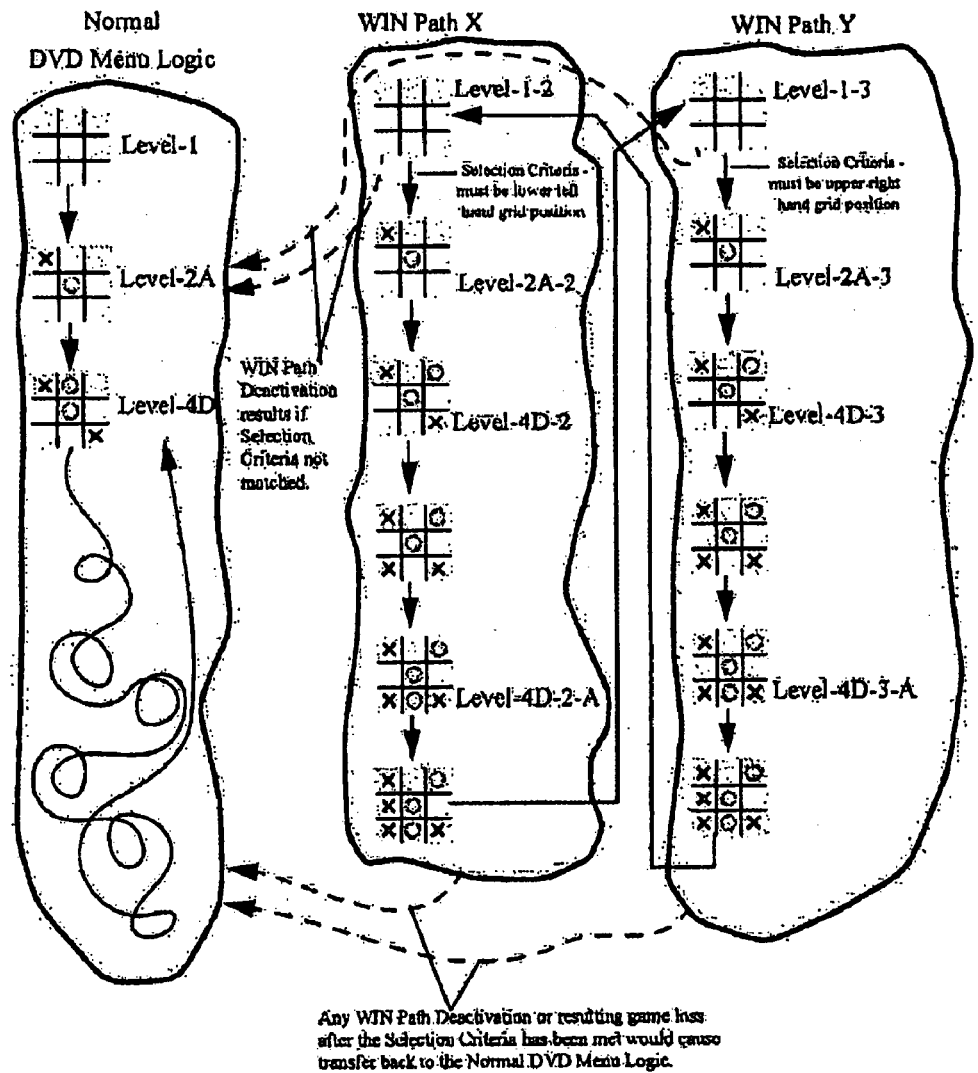

FIG. 1 represents the Game Board Construction
FIG. 2 represents the Re-Orientation Patterns.
FIG. 3 represents Level 1 to Level 2 Transitions
FIG. 4-6 represents Transition diagrams
FIG. 7 represents an example of a win path added
FIG. 8 represents an example of having a secondary win path
FIG. 9 represents the menus needed for normal DVD menu logic
FIG. 10 represents level-1 positions
FIG. 11A-C represents Level-2 positions
FIG. 12A-I represents Level-4 positions
FIG. 13A-K represents Level-6 positions
FIG. 14A-F represents Level-8 positions
FIG. 15A-B represents special transitions after 'O' token placement This invention utilizes game board symmetry and pattern matching to reduce the total number of menus needed for a "Human vs. DVD Menu Logic" game to be only 30 menus. This is done by allowing the Tic-Tac-Toe board to be displayed in 3-D space and allowing the board to be rotated and flipped so that the patterns of tokens can be matched after each re-orientation during game play thus reducing the number of DVD menus needed. The game board ("#") consists of two sets of parallel lines that are perpendicular to each other and cross each other as shown in Illustration 1—Game Board Construction. In this illustration the game board lines have thickness that have been stylized to give the board character. The stylizing can also include alterations to the shape of the lines used, however this stylizing is done in such a way that the stylized pattern maintains 4 axis of symmetry when the board is re-oriented as shown in Illustration 2—Re-orientation Patterns. The unique part of any game board is contained in ⅛ of the pattern. This ⅛ pattern is mirrored along all 3 axis to produce a game board that is symmetrical along 4 axis lines running through the center of the game board as shown.

Illustration 2—Re-orientation Patterns shows how any particular state of the game can be re-oriented into 7 other patterns by either rotating or flipping the board in 3-D space. Each of the resulting patterns can be matched to other resulting patterns thus allowing for a reduction in the number of menus needed.

For example Level-1 could fan out into 9 separate menus (as shown in Illustration 3—Level 1 to Level 2 Transitions), however using game board re-orientation and pattern matching the game boards are re-oriented and matched and thus reduced into 3 distinct menus, so that, in this case, 6 menu screens have been eliminated:

In Illustration 3—Level 1 to Level 2 Transitions the solid lines represent animated transitions between board states. In this illustration, to the human player the menu Level-1 is the interactive screen which allows selection of the position for X token placement. When the desired grid position is selected via pressing the up/down and left/right cursor keys for navigating a DVD menu, and then pressing Enter on the DVD remote, one of the nine paths shown will be taken. In this example positions 1, 4, and 5 do not need the game board to be re-oriented, however they do need to have some animation showing the addition of the O token onto the board. If positions 2, 3, 6, 7, 8, or 9 are selected, unique animation is used to re-orient the game board after which control is passed to the transition needed to complete the animation which adds the O token to the game thus carrying out the specified Normal DVD Menu Logic. Each of these 3 animations for adding an O token to the game board lead to one of the next 3 corresponding menus: Level-2A, Level-2B, or Level-2C. The Normal DVD Menu Logic shown in Illustration 3—Level 1 to Level 2 Transitions is a reflection of the logic specified in the table Level-1. The Normal DVD Menu Logic for the remaining 29 menus are documented only in tables. The diagram in Illustration 3—Level 1 to Level 2 Transitions was drawn out so that these tables could be more easily understood.

During both the animation for re-orientation of the board and the placement of O tokens on the game board, sound can be included to enhance the animation and the overall experience of the human player.

There are 30 game board menus needed to complete all the Normal DVD Menu Logic to form a closed loop of menus and animated transitions which address all possible human player selections that can be made during game play. The details for these 30 menus can be found in the tables specifying the links used for each game board state (or Level).

Each of these menus could either be static menus which contain the active game board (as shown in the following list), or motion menus which contain the active game board as well as other elements either related to the game or not. For example each game board may be displayed together with a vendors list of products and services which can be investigated at any time via extra buttons on each menu. Or short video clips of the products in action may be displayed simultaneously with each active game board menu. Any audio clip could also be added to these menus.

During development of the animations needed for flipping and rotating it was discovered that people respond best to the game board is being re-oriented when the following rules are followed:

The game board is rotated only when looking head on (not rotated when it is on its side. This is so that the tokens can be observed easily throughout the re-orientation animation. (Refer to Illustration 4—Transition—Level-2A-Position-5-UNIQUE).

Only top-bottom and left-right flips are performed even though flipping along a diagonal is possible. (Refer to Illustration 5—Transition—Level-4B-Position-5-UNIQUE to see how a left-right flip is animated).

All the tokens maintain their orientation to the display screen during any rotating or flipping of the board. The center of each token sticks to the center of the grid position it had been placed into while the game board is being re-oriented. (Refer to Illustration 4—Transition—Level-2A-Position-5-UNIQUE; note that throughout all re-orientations each of the tokens maintain their orientation with respect to the screen that the game is being displayed on throughout the transition animation).

Other board actions such as the addition of a token must not occur simultaneously with a re-orientation of the game board.

Multiple re-orientation actions are performed in a sequence and not simultaneously. (Refer to Illustration 6—Transition—Level-4C-Position-3-UNIQUE to see how an animated transition is sequenced when two separate re-orientation actions are performed).

An interval of 2 seconds is needed for each re-orientation animation to be easy enough to comprehend and yet short enough to keep the human players attention during game play.

Since the tokens are always oriented the same way to a human observer, the tokens do not have to be symmetrical pieces like the normal X's and O's that are typically used in a Tic-Tac-Toe game. The tokens shown in illustrations 4 through 6 are not symmetrical due to the small circle drawn on each ones upper right hand corner. Notice in each of these illustrations that each token always maintains its orientation as it is re-positioned when the game board is being re-oriented. The X's and O's may be replaced with any token markers such as the picture of a person's face or seasonal graphics such as a Halloween theme using tokens of pumpkins vs. skull and cross bones.

The entire set of menus and animations for this DVD based Tic-Tac-Toe game are kept in DVD menus, thus allowing all the DVD title tracks to be available for other video material. All the menus and logic for an entire game can reside in less than ½ of the 1 Gbyte limit that is placed on the total size of each menu class (for example as specified in Adobe Encore DVD) contained on a DVD. This allows the game to be included with any other DVD based video material.

Since the Normal DVD Menu Logic never allows the human player to win, the game would not be very interesting to play for very long. DVD Menus can be made which mimic the operation of the Normal DVD Menu Logic but have been split off so that the game could be altered thus allowing new dimensions of game play.

One of the intelligent (thinking two moves ahead) logic in the Normal DVD Menu Logic is the placement of the O token during the Level-2A-Position-7 transition. If instead of choosing a side to place the O token, one of the 2 open corner grid positions was chosen, the X tokens will have an advantage after the next move if the next X token is used to block the O tokens from winning. Illustration 7—Example of a WIN path added shows a parallel path operating in conjunction with the Normal DVD Menu Logic.

In Illustration 7—Example of a WIN path added the capability for the X tokens to win has been added using 4 new menus (Level-1-2, Level-2A-2, Level-4D-2, and Level-4D-2-A) and 13 animated transitions. However the activation of this WIN Path occurs, any deviation from a specific set of WIN Path criteria will cause the WIN Path to be deactivated. If WIN Path deactivation occurs, control will be handed to the equivalent menu in the Normal DVD Menu Logic. For example while in the Level-1-2 Menu of the WIN Path, the criteria for continuing onto the Level-2A-2 Menu might be limited to selecting the lower left hand grid position, any other grid position selected would result in the same outcome as if the Normal DVD Menu Logic was being used thus deactivating the WIN Path. Or the criteria could be opened up so that any corner grid position selected in the Level-1-2 Menu would allow control to be advanced to the Level-2A-2 menu.

If the human player arrives at the menu indicated by the "X token WIN!!" message, then control could be passed back to either the Level-1 menu specified in the Normal DVD Menu Logic, or an additional WIN Path. This allows the logic of the game to be made even more advanced which will keep a human player more interested since the Normal Logic behavior will change from one sequence of game play to the next. This is especially true when the game is constructed in such a way that the X tokens can never win the same way in 2 consecutive games. This can be done by creating a second WIN Path for which the criteria for continuing is different and when the game has been won by the human player, control will be continued on the secondary win path. In Illustration 8—Example of Having a Secondary WIN Path shows 3 paths of execution: the Normal DVD Menu Logic, WIN Path X and WIN Path Y. In this example, WIN Path X is activated first. The criteria for going from the Level-1-2 menu to the Level-2A-2 menu is selection of the lower left hand grid position. However, the criteria for going from the Level-1-3 menu to the Level-2A-3 menu in WIN Path Y is selection of the upper right hand grid position. If the WIN Path X advances all the way to the menu which indicates that the player won, control would be passed to the Level-1-3 menu in WIN Path Y. In this way the human player cannot win 2 consecutive games while selecting the same sequence of grid positions to occupy with the X tokens during game play.

Another DVD Menu-ing feature that helps out for saving space is that of override links. When control is passed to a menu an optional override link can be passed to it which gives the animated transition information of where to pass control to when it has completed executing. This allows an animated transition to be reused without utilizing and extra space resources on the DVD. This means that the 13 transitions for WIN Path X can be reused for all 13 transitions used for WIN Path Y. So each additional WIN path only adds the resources needed for 4 additional menus. No new animated transitions are needed.

The WIN Path shown in Illustration 7—Example of a WIN path added is only one example of adding in a scenario for which the human player can win. Many other scenarios could be added which allow the human player to win.

To make it even harder for a human player to recognize the internal logic of the game, certain WIN Path deactivations could result in a transition to a secondary WIN Path instead of returning to the Normal DVD Menu Logic.

When a DVD is first inserted into a DVD player control is passed to a "first play" link which is an attribute of every DVD. Either a menu or a title track can be the video material which is link to by the "first play" link.

As an alternative to the Normal DVD Menu Logic, a WIN Enabled Path would be linked to at the beginning of game play via the "first play" link. The WIN Path could be expanded to include multiple means of winning the first time through, then switch to either a WIN Enabled path with less options to win, or back the Normal DVD Menu Logic. In this way game play the overall DVD Menu Logic would allow games to be won easily when the DVD is first used, then the game would be adjusted to be more difficult (via switching WIN Paths) or impossible to win as each game is won.

At the end of each succession of game play, the result WIN, LOSS, or CATS (as games are labeled if there are no winners and every grid position has been filled with a token) can be used to determine which path game play should be continued with. In effect this allows the game to be dynamically adjusted and will make the human player more interested in how the internal logic of the game has been setup.

Instead of (or in addition to) basing game play path selection on Wins/Losses or "First Start", simple navigation while in a menu can be used to cause WIN Path activation without the human player realizing that navigation within a menu itself is part of the DVD Menu Logic since there would be no visual clue that a game play path change had resulted. This utilized the DVD Menu Auto Activate Button feature which causes a button to be automatically activated when the menu button is highlighted. This provides a hidden method for the changing the rules of game play. This can be made to occur for any menu which has an identical state with another game play path (either a WIN Path or the Normal DVD Menu Logic).

A WIN Path would conclude execution which resulted in a WIN by passing control to a menu which displays the number of consecutive WINs as being "1". Then control would be passed to another WIN Path and if the game play execution in this WIN Path resulted in a second WIN control would be passed to another menu which would displays the number of consecutive WINs as being "2". If this staged WIN Path execution was deviated from then control would return to the Normal DVD Menu Logic. To make the counting mechanism seem consistent, the Normal DVD Menu Logic would add one additional DVD Menu to indicate that the number of consecutive WINs is "0".

This Consecutive WINs Counter only keeps track of the number of times that the X tokens have won a games consecutively.

Additional customization can be made such as providing additional menus which comment on the game play. For example "Great Job" or "Win Opportunity Blown". Also menu and transition paths could be provided to go completely off topic from the game such as providing an advertisement for a company. Or additional puzzles, games, or information could be inserted into game play. For example a multiple choice science, math, or english question when answered correctly could allow game play to continue (and also possibly increment the Consecutive WINs counter) or reset the Consecutive WINs counter if answered incorrectly.

All of the tables provided indicate how each of the 30 game board menus interconnects with each other to link together the entire set of DVD menus and animated transitions needed for the Normal DVD Menu Logic. This is not the only way to implement this Normal DVD Menu Logic, however it does represent the smallest number of menus and linking animation segments needed to establish this Closed-Loop set of DVD Menus and Animated Transitions. (Refer to Illustration 3—Level 1 to Level 2 Transitions to understand how this first table {and all the tables that follow it} corresponds to the reduction of menus via game board re-orientation and pattern matching)

To maintain a Closed-Loop of Normal DVD Menu Logic the arrival of game play into a "game over" state would link back to the Level-1 Menu allowing game play to begin again.

To make the game more visually interesting, the point of view in 3-D space can be changed between levels of game play. This would still allow pattern matching of the board and tokens for each animated transition.

What is claimed is:

1. A Video Tic-Tac-Toe game encoded within DVD compatible media played in a 3×3 Tic-Tac-Toe game grid using any DVD-Video playing device allowing a person to view the said grid on a video viewing device and select an individual token position to be occupied in the said grid via DVD menus after which said selection results in an animated transition during which a single opposing token position is automatically and optimally placed, so as never to give the person playing a chance to win, into the said grid and is animated to reposition the said grid in virtual 3-D space by visually animating the said grid via flipping and/or rotating the resulting pattern of tokens in the said grid, while the said tokens are kept centered at their relative positions within the grid, into a unique pattern orientation so only symmetrically unique patterns of tokens are encoded into the game as corresponding to individual unique DVD menus each of which represents a unique state of the game and for which each said unique state of the game allows a person to select from the remaining unoccupied positions of each said unique DVD menu until either the placement of opposing tokens results in 3 opposing tokens in a row, column or along a diagonal through the said grid indicating that the person playing has lost the game and by animating each said loss by highlighting the opposing tokens which caused the loss, or by there being only a single open token position remaining after which placement by the person playing will not result in either set of tokens representing a said loss, will cause an animated transition which places the said grid back to its original state of being empty and thus allowing the game to be repeated by forming a closed loop set of DVD menus and animated menu transitions which accounts for every conceivable path of game execution and minimizes the number of DVD menus needed to 30 or less.

2. A DVD Player based video game as described in which has been modified to include one or more duplicated unique DVD menus which are visually identical but which allow alternate paths of game play to be available of which some of the said alternate paths can be win enabled paths which have DVD menus and transitions which when taken, allow a person playing the game the opportunity to assemble 3 tokens in a row, column, or along a diagonal and thus win and which said win path arrives at an animated video sequence in which the tokens that caused the win are highlighted after which control is optionally allowed to either repeat the winning animation or start a new game by transitioning back to a DVD menu which contains no tokens.

3. A DVD Player based video game as described in which allows custom menus and video clips to be arrived at during game play or when game play has ended.

4. A DVD Player based video game as described in which animates any rotation and/or flipping of the said 3×3 Tic-Tac-Toe game grid while keeping the orientation of all said tokens the same entirely throughout each said animated transition.

5. A DVD Player based video game as described in which allows the number keys "1" through "9" of any DVD Remote Control to instantly select the position to place a token within the said 3×3 Tic-Tac-Toe game grid by mapping the "1" key to the upper left-hand position within the said grid; the "2" key to the upper middle position within the said grid; the "3" key to the upper right-hand position within the said grid; the "4" key to the middle left-hand position within the said grid; the "5" key to the center position within the said grid; the "6" key to the middle right-hand position within the said grid; the "7" key to the lower left-hand position within the said grid; the "8" key to the lower middle position within the said grid; the "9" key to the lower right-hand position within the grid.

6. A DVD Player based video game as described in claim 1 which animates any rotation and/or flipping of the said 3.times.3 game grid while keeping the orientation of all said tokens the same entirely throughout each said animated transition.

7. A DVD player based video game as described in claim 1 in which the pattern considered to be a win is when 3 tokens that have been placed by a person are aligned in a row, column, or along a diagonal within the said 3.times.3 game grid.

8. A DVD Player based video game as described in claim 7 in which opposing tokens are automatically and optimally placed so that the tokens placed by a person via the said built-in DVD menu navigation and selection mechanisms are never allowed to form a pattern considered to be a win.

9. A DVD Player based video game as described in claim 8 which has been modified to include one or more duplicated unique DVD menus which are visually identical but which allow alternate paths of game play to be available of which some of the said alternate paths can be win enabled paths which have DVD menus and animated transitions which when taken, allow a person playing the game the opportunity to win.

10. A DVD Player based video game as described in claim 1 in which the 3.times.3 game grid is replaced with an n.times.n game grid in which n is 2 or greater.

11. A DVD Player based video game as described in claim 1 in which the 3.times.3 game grid is replaced with an n.times.m game grid in which both n and m are 2 or greater and in which n and m are not equal to each other.

* * * * *

UNITED STATES PATENT AND TRADEMARK OFFICE
CERTIFICATE OF CORRECTION

PATENT NO. : 7,335,098 B2
APPLICATION NO. : 11/163403
DATED : February 26, 2008
INVENTOR(S) : Richard P. Earl It is certified that error appears in the above-identified patent and that said Letters Patent is hereby corrected as shown below:

Replace the claims text running from column 6 line 62 through column 8 line 14 with the following text:

1. A DVD Player based video game encoded within any standardized DVD formatted media (including Standard, HD-DVD, and Blu-Ray Disc formats) which is targeted to work within a compatible DVD Player connected to any compatible video viewing device in which a 3×3 game grid is visually represented on the said video viewing device and which consists of a plurity of DVD menus and a plurity of animated transitions which are linked together to form the said DVD Player based video game of which each said DVD menu allows a person to select an individual game grid position using the said compatible DVD Player's standard built-in DVD menu navigation and selection mechanisms by which a token or opposing token is visually placed into the said game grid in an individual game grid position and which said DVD Player based video game contains at least two of the said DVD menus which are linked together via an animated transition which repositions the said game grid in virtual 3-D space by visually animating the said game grid to flip and/or rotate while the said token(s) and/or opposing token(s) are kept centered at their relative positions within the said game grid.

2. A DVD Player based video game as described in claim 1 which forms a closed loop of DVD menus and animated transitions which allows the said DVD Player based video game to be repeated automatically.

3. A DVD Player based video game as described in claim 1 which minimizes the number of DVD menus needed so that only DVD menus which are symmetrically unique with regard to the tokens, opposing tokens, and/or unoccupied grid positions within the said game grid are encoded into the said DVD Player based video game.

4. A DVD Player based video game as described in claim 1 which allows non-game specific DVD menus, audio and/or video clips to be arrived at during game play or when game play has ended.

Signed and Sealed this

Thirteenth Day of July, 2010

David J. Kappos
*Director of the United States Patent and Trademark Office*

5. A DVD Player based video game as described in claim 1 which allows the number keys "1" through "9" of any DVD Remote Control to instantly select the position to place a token or opposing token within the said 3×3 game grid by mapping the "1" key to the upper left-hand position within the said grid; the "2" key to the upper middle position within the said grid; the "3" key to the upper right-hand position within the said grid; the "4" key to the middle left-hand position within the said grid; the "5" key to the center position within the said grid; the "6" key to the middle right-hand position within the said grid; the "7" key to the lower left-hand position within the said grid; the "8" key to the lower middle position within the said grid; the "9" key to the lower right-hand position within the grid.

Replace the text ".times." in column 8 line 17 with the multiplication symbol "×".

Replace the text ".times." in column 8 line 23 with the multiplication symbol "×".

Replace the text ".times." in column 8 line 39 with the multiplication symbol "×".

Replace the text ".times." in column 8 line 42 with the multiplication symbol "×".

Replace the word "illustration" in column 2 - line 41 with the word "figure".

Replace the word "illustration" in column 2 - line 47-48 with the word "figure".

Replace the word "illustration" in column 2 - line 53 with the word "figure".

Replace the word "illustration" in column 2 - line 60 with the word "figure".

Replace the word "illustration" in column 2 - line 65 with the word "figure".

Replace the word "illustration" in column 3 - line 17 with the word "figure".

Replace the word "illustration" in column 3 - line 20 with the word "figure".

Replace the word "illustration" in column 3 - line 51 with the word "figure".

Replace the word "illustration" in column 3 - line 55 with the word "figure".

Replace the word "illustration" in column 3 - line 61 with the word "figure".

Replace the word "illustration" in column 4 - line 5 with the word "figure".

Replace the word "illustrations" in column 4 - line 16 with the word "figures".

Replace the word "illustrations" in column 4 - line 19 with the word "figures".

Replace the word "illustration" in column 4 - line 46 with the word "figure".

Replace the word "illustration" in column 4 - line 49 with the word "figure".

Replace the word "illustration" in column 5 - line 12 with the word "figure".

Replace the word "illustration" in column 5 - line 37 with the word "figure".

Replace the word "illustration" in column 6 - line 49 with the word "figure".